United States Patent
Aich et al.

(10) Patent No.: US 10,336,318 B2
(45) Date of Patent: Jul. 2, 2019

(54) SYSTEMS AND METHODS FOR VEHICLE PARK ASSIST

(71) Applicant: FORD GLOBAL TECHNOLOGIES, LLC, Dearborn, MI (US)

(72) Inventors: Sudipto Aich, Palo Alto, CA (US); Casey Bryan Feldman, Royal Oak, MI (US); Jamel Seagraves, Mountain View, CA (US); Yonathan Redda, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 552 days.

(21) Appl. No.: 14/745,959

(22) Filed: Jun. 22, 2015

(65) Prior Publication Data

US 2016/0368489 A1  Dec. 22, 2016

(51) Int. Cl.
*B60W 30/06* (2006.01)
*B60W 10/20* (2006.01)
(Continued)

(52) U.S. Cl.
CPC .............. *B60W 30/06* (2013.01); *B60T 7/18* (2013.01); *B60T 7/22* (2013.01); *B60W 10/18* (2013.01); *B60W 10/20* (2013.01); *B62D 15/0285* (2013.01); *B60T 2201/10* (2013.01); *B60W 2550/10* (2013.01); *B60W 2710/18* (2013.01); *B60W 2710/20* (2013.01)

(58) Field of Classification Search
None
See application file for complete search history.

(56) References Cited

U.S. PATENT DOCUMENTS 4,931,930 A * 6/1990 Shyu ...................... B60Q 9/007
                                                                180/167
6,154,150 A    11/2000 Laubach
(Continued)

FOREIGN PATENT DOCUMENTS

DE    102008033925 A1 *  1/2010  .............. B62D 1/00
DE    102014107305 A1 *  5/2014  ............. G08G 1/168
(Continued)

OTHER PUBLICATIONS

Machine translation of DE102008033925 (A1).*
(Continued)

*Primary Examiner* — Hussein Elchanti
*Assistant Examiner* — Paul A Castro
(74) *Attorney, Agent, or Firm* — Frank Lollo; Brooks Kushman P.C.

(57) ABSTRACT

A vehicle parking assist system includes at least one processor configured to establish communication with a parking automation system external to a vehicle to assist in a parking maneuver. The parking automation system includes at least one sensor to provide a measured distance value from an object to the vehicle. The processor is further configured to control a brake system of the vehicle based on the measured distance value via the sensor. The processor is further configured to control the vehicle to come to a stop based on the measured distance value being less than a first predefined threshold via the brake system.

15 Claims, 4 Drawing Sheets

(51) Int. Cl.
  *B60T 7/12*   (2006.01)
  *B60W 10/18*  (2012.01)
  *B60T 7/18*   (2006.01)
  *B60T 7/22*   (2006.01)
  *B62D 15/02*  (2006.01)

(56) References Cited

U.S. PATENT DOCUMENTS

| | | | |
|---|---|---|---|
| 6,563,431 B1 | 5/2003 | Miller, Jr. | |
| 8,319,663 B2 | 11/2012 | Von Reyher et al. | |
| 8,810,434 B2 | 8/2014 | Groult et al. | |
| 8,878,646 B2 | 11/2014 | Chutorash et al. | |
| 9,010,107 B2 * | 4/2015 | Yamada | B60T 13/745 60/545 |
| 9,076,336 B2 * | 7/2015 | Tippelhofer | G08G 1/143 |
| 10,025,990 B2 * | 7/2018 | Cortelyou | G08G 1/01 |
| 2011/0254675 A1 * | 10/2011 | Koehler | B60K 28/066 340/439 |
| 2017/0084179 A1 * | 3/2017 | Chen | B62D 15/025 |
| 2017/0297577 A1 * | 10/2017 | Tsuji | B60W 30/18109 |
| 2018/0047290 A1 * | 2/2018 | Min | E01F 9/617 |

FOREIGN PATENT DOCUMENTS

| | | | |
|---|---|---|---|
| JP | 11296798 A | | 10/1999 |
| JP | 2000041238 A | | 2/2000 |
| JP | 2001114046 A | * | 4/2001 |

OTHER PUBLICATIONS

Machine translastion of JP2001114046 (A).*
Great Britain Search Report for Great Britain Application No. GB1610758.3 dated Dec. 13, 2106.
R. Fritz, Car Parking Sensors, About.com Wireless/Networking, (2012) one page. <http://web.archive.org/web/20120112224918/http://compnetworking.about.com>.

* cited by examiner

SYSTEMS AND METHODS FOR VEHICLE PARK ASSIST

TECHNICAL FIELD

The present disclosure relates to a vehicle computing system communicating with one or more remote sensors to assist with a parking maneuver.

BACKGROUND

Many drivers find it difficult and troublesome when parking their vehicle in a garage. There have been many attempts to provide an apparatus which will alert a driver to an appropriate vehicle parking location within a garage. The apparatus may be affixed to a ceiling or a rear wall of the garage to provide the alert that may be visual to the driver. One example of a parking assist apparatus for the garage is the use of a ball suspended on a string from the ceiling of the garage. The driver controls the vehicle to enter the garage until a particular location on the windshield of the vehicle contacts the ball. The ball suspended on a string is aesthetically unappealing hanging from the ceiling of the garage. In addition, the ball and string apparatus is designed for one vehicle and may be unstable based on the ease of movement of the ball.

A more technical solution is a communication system and method in which the communication system includes a first communication module and a second communication module. The first communication module is located inside a vehicle and the second communication module is located in a garage door opener and/or a home. A first message of information transmitted wirelessly between the first and second communication modules may be related to status information of the vehicle. A second message of information is transmitted between the first and second communication modules. The second information relates to status information of the garage door opener and/or the home to assist the driver when parking the vehicle in the garage.

In another example, a method and system include the use of a portable communication device to assist a driver controlling a vehicle into or out of a parking space. A vehicle external sensor device is arranged stationary relative to the parking space. The sensor device captures data relating to the vehicle positioned at the parking space and wirelessly emits signals comprising the captured data in such a way that the signals reach the interior of the vehicle via the portable communication device. See, for example, U.S. Pat. Nos. 8,878,646 and 8,810,434.

SUMMARY

In at least one embodiment, a vehicle parking assist system includes at least one processor configured to establish communication with a parking automation system external to a vehicle to assist in a parking maneuver. The parking automation system includes at least one sensor to provide a measured distance value from an object to the vehicle. The processor is further configured to control a brake system of the vehicle based on the measured distance value via the sensor. The processor is further configured to control the vehicle to come to a stop based on the measured distance value being less than a first predefined threshold.

In at least one embodiment, a vehicle computing system includes a processor in communication with a remote parking automation system (PAS) to assist in a parking maneuver. The processor is configured to control a brake system in communication with the processor based on a first distance value via a first sensor of the PAS being less than a first predefined threshold. The processor is further configured to control a power steering system based on a second distance value via a second sensor of the PAS being less than a second predefined threshold.

In at least one embodiment, a computer-program product embodied in a non-transitory computer readable medium that is programmed for a vehicle processor and includes instructions for establishing communication with a remote parking automation system to provide parking assistance. The remote parking automation system includes at least one sensor to measure data related to a parking maneuver. The computer-program product includes further instructions for receiving one or more distance values via the at least one sensor based on a detected object. The computer-program product includes further instructions for transmitting brake control commands to a brake system and turning control commands to a power steering system of a vehicle based on the one or more distance values.

DETAILED DESCRIPTION

Figure 1:
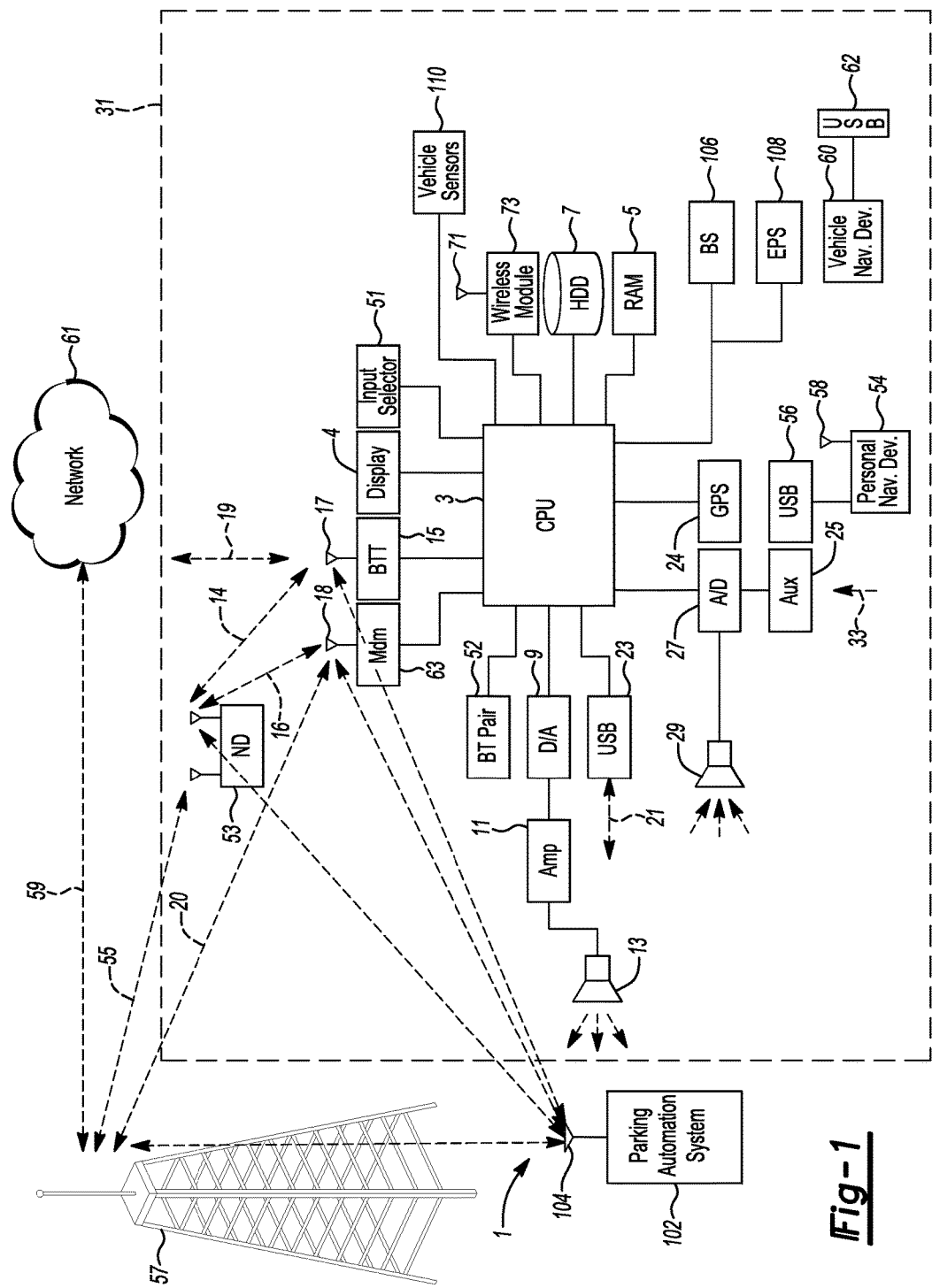
FIG. 1 is a representative block topology of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle computing system that may assist a driver in a parking maneuver. The vehicle computing system may include a rear view camera embedded near or at the rear bumper of a vehicle. The rear view camera may not capture data related to an angle of view that may improve the parking assistance for the vehicle.

For example, a parking garage may include a parking space. The parking garage may include a parking automation system having at least one sensor positioned to capture data related to the parking space. The sensor data may be used to assist in a vehicle parking maneuver. The parking automation system may transmit the sensor data to the vehicle computing system via an established wireless communication link. In another example, one or more sensors (proximity sensors, cameras, radar, etc., for example) may provide feedback to a driver when performing the parking maneuver in the garage. The one or more sensors may provide a notification to the driver of a vehicle position relative to a parking spot in the garage and/or data related to a distance value measuring the vehicle position to a wall of the garage. The parking automation system may transmit the notification and data to the vehicle computing system via a wireless communication link. In one example, a garage camera may transmit data comprising distance and/or vehicle position to the vehicle computing system using the wireless communication link. The one or more sensors may provide data comprising an angle of view not available using on-vehicle parking sensors and/or the on-vehicle rear view camera.

The embodiments of the present disclosure generally provide vehicle computing systems and methods to receive remote sensor data for parking assistance. In general, the vehicle computing system may be programmed to allow for communication with one or more sensors located at or near a parking spot in the parking garage using a wireless communication link. The wireless communication link may include, but is not limited to, WiFi, Bluetooth technology, and/or a combination thereof. The present disclosure provides the vehicle computing system the ability to assist and/or control a parking maneuver using one or more sensors positioned near the parking spot.

FIG. 1 illustrates an example block topology for a vehicle based computing system 1 (VCS) for a vehicle 31. An example of such a VCS 1 is the SYNC system manufactured by THE FORD MOTOR COMPANY. A vehicle enabled with a VCS 1 may contain a visual front end interface 4 located in the vehicle 31. The user may also be able to interact with the interface if it is provided, for example, with a touch sensitive screen. In another illustrative embodiment, the interaction occurs through button presses and/or spoken dialog with automatic speech recognition and speech synthesis.

In the illustrative embodiment 1 shown in FIG. 1, a processor 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to choose between various inputs. Input to both the microphone and the auxiliary connector is converted from analog to digital by a converter 27 before being passed to the processor. Although not shown, numerous vehicle components and auxiliary components in communication with the VCS 1 may use a vehicle network (such as, but not limited to, a CAN bus) to pass data to and from the VCS (or components thereof).

Outputs to the system can include, but are not limited to, the visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21, respectively.

In one illustrative embodiment, the system 1 uses the BLUETOOTH transceiver 17 to communicate 14 with a user's mobile device 53 (e.g., cell phone, smart phone, tablet, PDA, or any other device having wireless remote network connectivity). The mobile device (e.g., nomadic device) may then be used to communicate 59 with a network 61 outside the vehicle 31 through, for example, communication 55 with a cellular tower 57. In some embodiments, tower 57 may be a WiFi access point. Communication between the mobile device 53 and the BLUETOOTH transceiver is generally represented by signal 14.

Pairing a mobile device 53 and the BLUETOOTH transceiver 15 can be instructed through a button 52 or similar input. Accordingly, the CPU is instructed that the onboard BLUETOOTH transceiver will be paired with a BLUETOOTH transceiver in a mobile device 53.

In another example, the mobile device 53 may be configured to communicate with the VCS 1 via one or more applications executed on hardware at the VCS 1. For example, the processor 3 may transmit one or more messages to the mobile device 53 via the BLUETOOTH transceiver 17. In another example, the processor 3 may receive one or more messages from the mobile device 53 via the BLUETOOTH transceiver 17.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one example, the VCS 1 may be configured to communicate with a parking automation system 102 outside the vehicle 31 through, the mobile device 53, the onboard modem 63, the BLUETOOTH transceiver 17, and/or a combination thereof. The parking automation system 102 may include a wireless transceiver 104 configured to receive data from one or more sensors. The one or more sensor may measure information used to assist a driver when parking a vehicle in a parking spot. The parking automation system 102 may transmit the received data from the one or more sensors to the VCS 1 via the wireless transceiver 104.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a mobile device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the mobile device 53 includes a modem for voice band or broadband data communication. In the data-over-voice embodiment, a technique known as frequency division multiplexing may be implemented when the owner of the mobile device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the mobile device, it is possible that the data plan allows for broad-band transmission and the system could use a much wider bandwidth (speeding up data transfer). In still another embodiment, the mobile device 53 is replaced with a cellular communication device that is installed to the vehicle 31. In yet another embodiment, the mobile device (e.g., the nomadic device illustrated as ND 53) may be a wireless local area network (LAN) device capable of communication over, for example (and without limitation), an 802.11g network (i.e., WiFi) or a WiMax network.

In one embodiment, incoming data can be passed through the mobile device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other processors and vehicle sensors associated with one or more embedded vehicle systems. For example, the CPU 3 may be in communication with a brake system (BS) 106, an electrically assisted power steering system (EPS) 108, a transmission control module, and/or an engine control module. These systems may be in communication with the CPU 3 via the vehicle network connection. The vehicle sensors 110 associated with one or more systems may monitor vehicle operation. The vehicle sensors 110 may include ultrasonic sensors, rear view camera, front view camera, distance sensors that detect objects around the vehicle, accelerometers, position sensors, etc. The vehicle sensors 110 may receive vehicle operation data including, but not limited to, steering wheel steering angle, accelerator position, brake pedal position, vehicle velocity, powertrain shift lever operation (Park, Reverse, Drive, and Neutral), etc.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having various processes executed by a vehicle computing system located in a vehicle, in certain embodiments, processes may be executed by a computing system in communication with a vehicle computing system. Such a system may include, but is not limited to, a wireless mobile device 53 (a mobile phone, for example), a remote computing system (a server, for example) connected through the wireless device, or the parking automation system 102. Collectively, such systems may be referred to as vehicle associated computing systems (VACS). In certain embodiments, particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS), in communication with one or more systems, located within the vehicle itself is capable of performing the representative processes.

Figure 2:
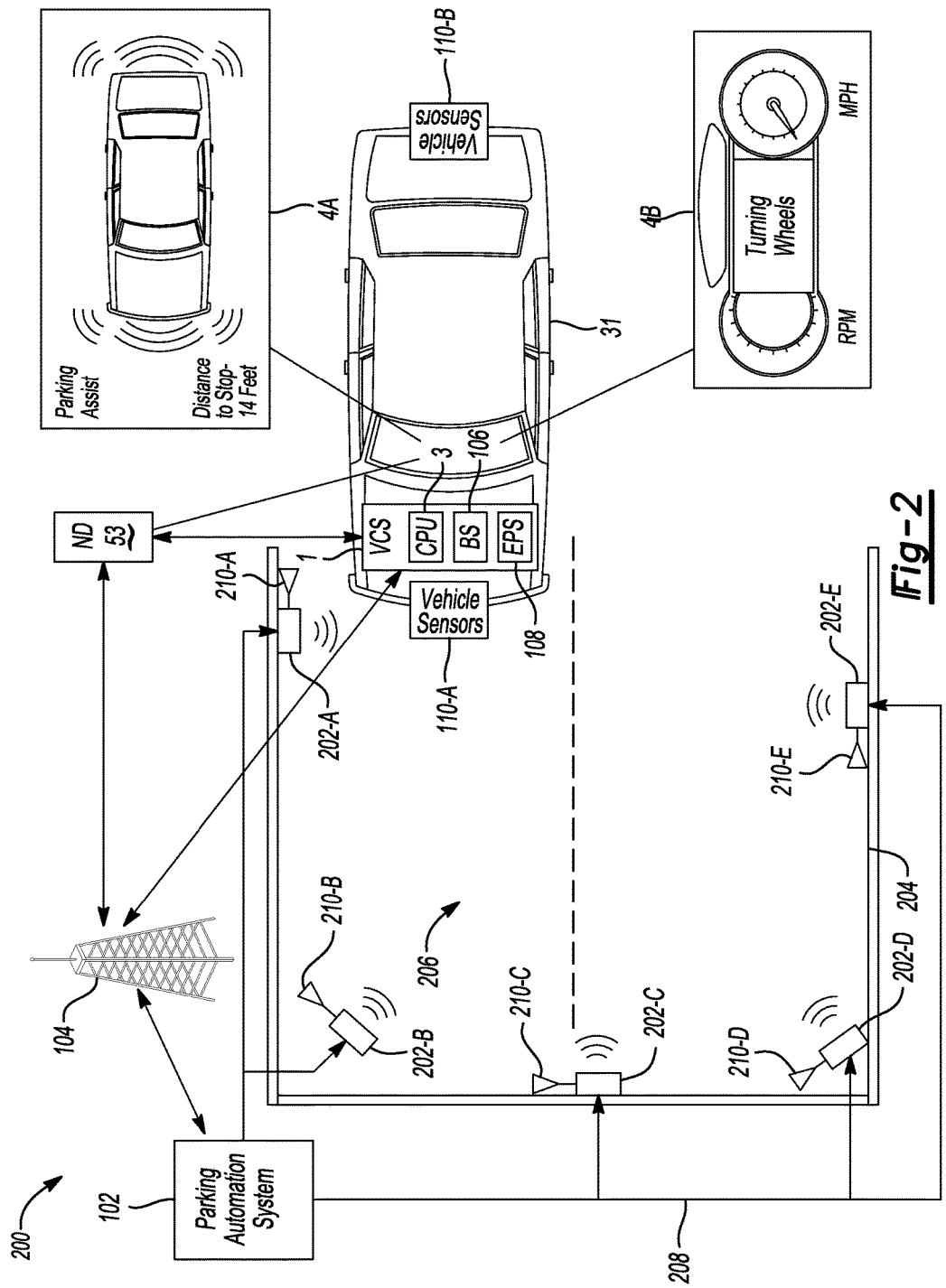
FIG. 2 is a representative block topology of a parking automation system communicating with the vehicle based computing system according to an embodiment.

FIG. 2 is a representative block topology 200 of the parking automation system 102 communicating with the VCS 1, according to an embodiment. As shown, FIG. 2 illustrates a system and method to assist a driver to maneuver the vehicle 31 into a parking spot 206. The parking automation system 102 includes one or more sensors 202-A through 202-E (collectively 202) affixed to at least one wall 204 and/or ceiling of the parking structure. The one or more sensors 202 may include, but are not limited to, a camera, a laser sensor, an infrared sensor, an ultrasonic sensor, a proximity sensor, and/or a combination thereof. The one or more sensors 202 may be positioned near the parking spot 206 to provide vehicle parking data to the VCS 1 via the parking automation system 102. The parking automation system 102 may communicate with the one or more sensors 202 using wired 208 and/or wireless communication 210-A through 210-E (collectively 210).

The parking automation system 102 may include a transceiver 104 configured to establish communication with the VCS 1. The parking automation system transceiver 104 may establish a local network connection with the one or more sensors 202, VCS 1, and/or a combination thereof. In another example, the parking automation system transceiver 104 may establish a global system for mobile communications (GSM) network to communicate data received from the one or more sensors 202 to the VCS 1.

For example, the VCS 1 may establish communication via a wireless connection with the parking automation system 102 based on the vehicle 31 entering a predefined vicinity of the parking structure. The wireless communication may include a BLUETOOTH pairing between the parking automation system 102, the VCS 1, the mobile device communicating with the VCS 1, and/or a combination thereof. In one example, the parking automation system 102 may include a GSM network such that the VCS 1, and/or the mobile device 53 in communication with the VCS 1, may establish a connection via the transceiver 104 based on the predefined vicinity. The predefined vicinity may be configured based on a value associated with the measured distance between the vehicle 31 and the parking spot 206. For example, the parking automation system may initiate communication with the VCS 1 when the distance between the parking spot 206 and vehicle 31 is less than the predefined vicinity. In another example, the VCS 1 may initiate communication with the parking automation system 102 when the distance between the parking spot 206 and vehicle 31 is less than the predefined vicinity.

The VCS 1 is configured to communicate with one or more remote sensors 202 to assist in a driving maneuver to park the vehicle 31 in the parking spot 206. For example, a home garage may include one or more sensors 202 affixed to the wall(s) 204 of the garage. The one or more sensors 202 may be positioned to capture certain angle and/or distance data related to the vehicle driving in the parking spot 206. The one or more sensors 202 may transmit the data to the parking automation system 102. The parking automation system 102 may receive the data from the sensors 202 via the transceiver 104 and/or the wired connection 208.

The VCS 1 may accept the sensor data embedded in wireless signals transmitted from the transceiver 104 of the parking automation system 102. The VCS 1 may extract and process the parking automation system data received from wireless signals via the processor 3. The processor 3 may contain one or more software programs to control and/or assist the parking maneuver of the vehicle for the parking spot 206. For example, the processor 3 may be configured to communicate the parking automation system data to the brake system 106 and the electrically assisted power steering system (EPS) 108. The brake system 106 may control braking of the vehicle based on the data received from the parking automation system 102. The EPS 108 may control steering of the vehicle based on the data received form the parking automation system 102.

For example, the VCS 1 may receive parking data from the vehicle sensors 110 to calculate the current position and operation state of the vehicle. In response to the data received from the parking automation system 102, the VCS 1 may calculate an updated current position and operation state of the vehicle 31. For example, the VCS 1 may calculate a vehicle trajectory from a parking assistance start position to a parking target position using the vehicle sensors 110. The VCS 1 may update the vehicle trajectory based on the data received from the parking automation system 102. The updated vehicle trajectory may provide a parking trajectory with the fewest turns when the VCS 1 is performing a parking maneuver to the parking target position at the parking spot 206.

The vehicle sensors 110 (e.g., ultrasonic sensors) embedded on the outer periphery of the vehicle 31 may detect objects around the vehicle 31 on the basis of the reflected waves. The VCS 1 may receive data that includes detected object information in the parking spot 206 from the parking automation system 102. The detected object may include parking spot information such as parking lines, structure data (walls, railings, for example), vehicles parked next to the parking spot, and/or an unidentified object (children toys, bikes, etc., for example). The object detected data measured by the parking automation system sensors 202 may not be detected by the vehicle sensors 110. For example, the object detected by the parking automation system 102 may be sensed by the vehicle sensors 110 at a later time in the parking process causing the parking assistance to reset or calculate a remedial action vehicle trajectory. The parking automation system 102 may provide the VCS 1 the information necessary to calculate the parking trajectory for the parking assistance of the vehicle 31 before the vehicle enters and/or approaches the parking spot 206.

For example, a front vehicle sensor 110-A may not detect an object located out of the sensor's range. If the vehicle 31 is parallel to the parking spot 206, the front vehicle sensor 110-A may not be able to detect an object in the parking spot 206. Therefore, the parking automation system sensor 202 may be configured to provide distance and angle data of the detected object before the vehicle enters and/or approaches the parking spot 206. In another example, a rear vehicle sensor 110-B may not be able to detect an object in the parking spot 206 if the vehicle is forward facing the parking spot 206. Therefore, the parking automation system sensor 202 may provide data to the VCS 1 before the vehicle sensors 110 have the opportunity to detect the object and/or calculate a parking trajectory for the parking spot 206.

The EPS 108 may calculate steering wheel control commands based on data from at least one of the parking automation system 102, the vehicle sensor 110, and/or a combination thereof. The EPS 108 may provide control of a steering wheel, without driver input, based on the calculated steering wheel control. For driver assist parking, the EPS 108 may provide resistance and/or vibration warnings (e.g., a haptic sensor embedded in the steering wheel) to the steering wheel to alert the driver of a detected object and/or a parking trajectory calculation during the parking drive maneuver into the parking spot 206. The EPS 108 may be configured to enable a vehicle user to manually override the control of the steering based on manual turning of the steering wheel.

The VCS 1 may receive a measured distance value for the distance of the detected object to the vehicle 31 via the vehicle sensors 110. The parking automation system 102 may measure a vehicle distance value based on the vehicle 31, the object detected, and/or a combination thereof. For example, the parking automaton system sensor 202 may measure a distance to a detected object in relation to the parking spot 206 and vehicle 31. The parking automation system sensor 202 may transmit a data message to the VCS 1 to control the brake system 106 based on the distance to the detected object in relation to the parking spot 206 and the vehicle 31. In response to the VCS 1 comparing the measured distance data to a predefined stop distance threshold, the VCS 1 may transmit a message to the brake system 106 to apply the brakes. The brake system 106 may be configured to allow for a vehicle user to manually override the VCS 1 from controlling the brake based on the vehicle user depressing a brake pedal.

Additionally, the VCS 1 may be configured to output parking assist information at the display 4. The display 4 may include, but is not limited to, a center stack user interface display 4A and an instrument cluster display 4B. The VCS 1 may output vehicle operation instructions by which parking assist data may instruct a driver of the calculated vehicle trajectories. As shown in FIG. 2, the center stack user interface display 4A is displaying the distance to stop the vehicle at the parking target position. In one example, the driver may be aware using the center stack user interface display 4A that the vehicle may automatically stop as the distance to the parking target position is equal to a predefined threshold value. In another embodiment, the distance to stop value may provide the driver instructions to assist in parking the vehicle in the parking spot 206.

The instrument cluster display 4B is presenting the steering direction and angle amount of the steering wheel. Because the vehicle operation is presented on the display 4B, the driver may understand the contents of the vehicle operations taking place during the parking maneuver. The display device 4 is, for example, disposed in a position (in the instrument panel 4B, center stack 4A, etc.) where the driver can see it inside the vehicle cabin. Further, the display device 4 may display, to the driver, arbitrary information such as sensor information (outside air temperature, current time, for example) of the VCS 1 vehicle information, position information via the vehicle sensors 110, and parking automation system sensor 202 information. More specifically, the display 4 may display the parking target position, the trajectories for guiding the parking assist system's own vehicle to the parking target position, the vehicle operation method for moving the parking assist system's own vehicle to the parking target position, and the distance from the vehicle to the parking target position that has been calculated by the VCS 1.

Figure 3:
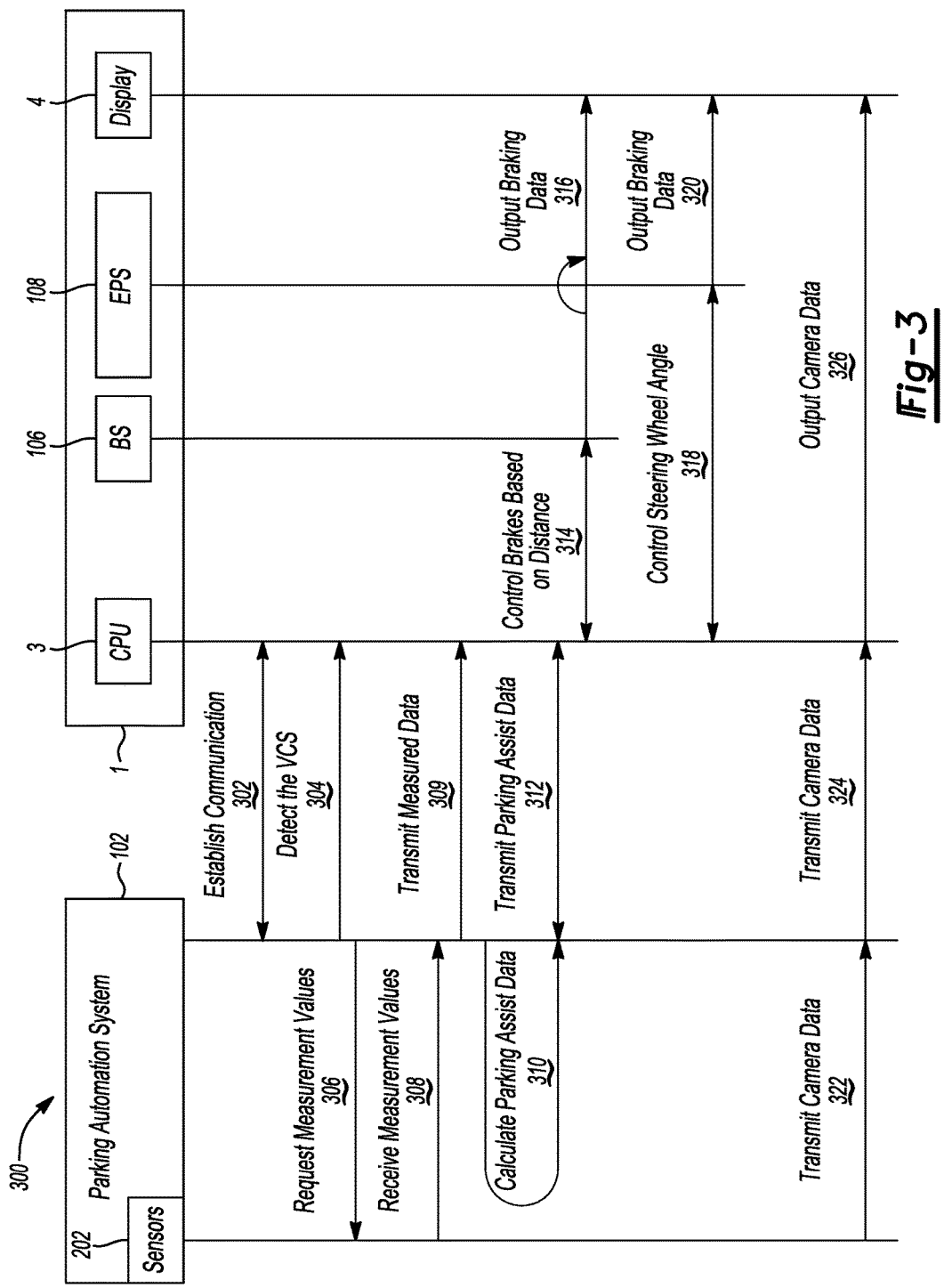
FIG. 3 is a flow chart illustrating the vehicle based computing system communicating parking information to one or more subsystems based on data received from the parking automation system according to an embodiment.

FIG. 3 is a flow chart 300 illustrating the VCS 1 communicating parking information to one or more subsystems based on data received from the parking automation system 102, according to an embodiment. The one or more subsystems include, but are not limited to, the brake system 106, and the EPS 108. The VCS 1 may receive parking assistance information from a parking automation system 102. The VCS may calculate the vehicle trajectory from a parking assistance start position to a parking target position based on the received parking assistance information. The VCS 1 may transmit one or more messages to assist a parking maneuver into a parking spot based on the calculated vehicle trajectory.

The VCS 1 may establish communication with the parking automation system 102 via a handshake process 302. The handshake process 302 may include a series of communications back and forth between the VCS 1 and parking automation system 102 for system access authentication purpose. If the handshake is complete, the VCS 1 may receive data from a parking assistance application executed at the parking automation system 102. For example, the handshake process may include the exchange of information to detect whether or not the parking automation system 102 has been paired with the VCS 1. In another example, the VCS may be executing an application associated with the parking automation system 102. The application may have a key configured to verify that the VCS 1 is authorized to communicate with the parking automation system 102.

The parking automation system 102 may detect the VCS 304 using several methods including signal strength of the established communication connection, detection of a vehicle via the sensor 202, and/or a combination thereof. In response to the detected VCS 1, the parking automation system 102 may request measurement values 306 related to the parking spot 206 using the one or more sensors 202. The parking automation system 102 may receive the measurement values 308 via the one or more sensors 202. The VCS 1 may receive the measurement values 309 from the one or more sensors 202 via the parking automation system 102.

In one example, the parking automation system 102 may calculate parking assist data 310 that includes vehicle trajectories, object detection, a parking target position, and the size of the parking spot. In another example, the parking automation system 102 may transmit the measured data from the one or more sensors 202 to the VCS 1 such that the processing of the vehicle trajectory is done at the VCS 1. The parking automation system 102 may transmit the calculated parking assist data 312 to the VCS 1.

The VCS 1 may receive the parking assist data from the parking automation system 102. The VCS 1 may calculate one or more parking assist variables to control the parking maneuver of the vehicle into the parking spot. For example, the VCS 1 may calculate a distance value of the vehicle to the parking target position based on the parking assist data. In response to the distance value of the parking target position, the VCS 1 may transmit a brake control message 314 to the brake system. The brake control message may request the brakes to be enabled based on the distance value falling below a predefined threshold value. The VCS may output the brake control message and/or data 316 at the display 4.

In another example, in response to the parking assist data 312 from the parking automation system 102, the VCS 1 may calculate one or more steering wheel turns based on the vehicle trajectory. The VCS 1 may transmit a steering wheel control message 318 to the EPS 108. The steering wheel control message 318 may request movement for the steering wheel angle based on the parking assist data. The VCS 1 may output the steering wheel control message and/or data 320 at the display 4.

The one or more sensors 202 for the parking automation system 102 may include a camera 202 positioned at the parking spot 206. The camera 202 may transmit camera data 322 of the parking space to the parking automation system 202. The parking automation system may transmit the camera data 324 to the VCS 1 via the wireless communication connection. The VCS 1 may output the camera data at the display 4. For example, the display may be configured to allow a driver to view the camera 202 image received from the parking automation system 102. In another example, the VCS 1 may receive the camera data and calculate the one or more parking assist variables to control the parking maneuver of the vehicle in the parking spot 206.

Figure 4:
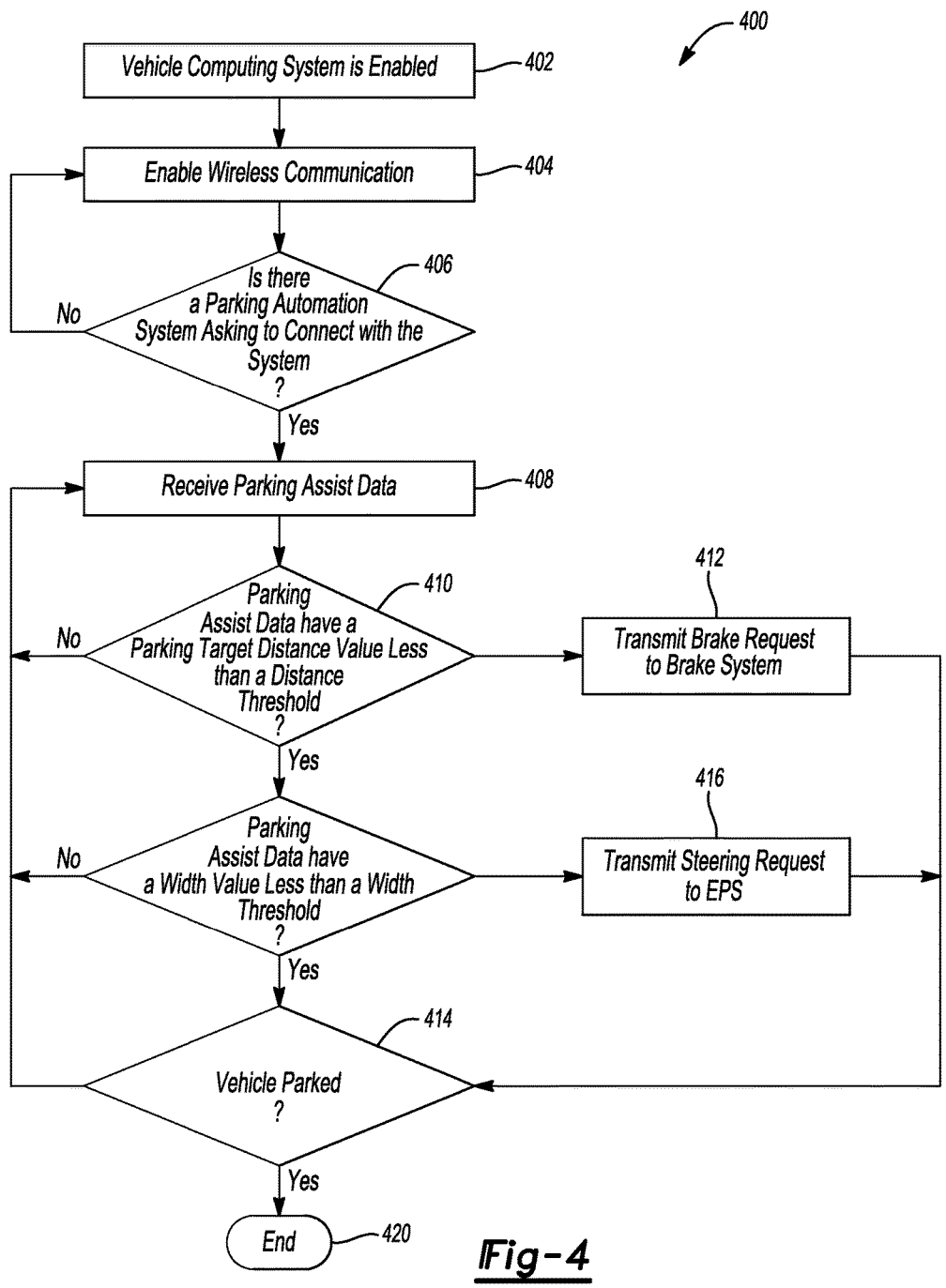
FIG. 4 is a flow chart illustrating the vehicle based computing system parking a vehicle based on data received from the parking automation system.

FIG. 4 is a flow chart illustrating the vehicle based computing system parking a vehicle based on data received from the parking automation system 102, according to an embodiment. The method 400 may be implemented using software code contained within the VCS 1. In other embodiments, the method 400 may be implemented in other vehicle controllers, distributed among multiple vehicle controllers, or executed at a remote controller in communication with the VCS 1.

Referring again to FIG. 4, the vehicle and its components illustrated in FIG. 1, FIG. 2 and FIG. 3 are referenced throughout the discussion of the method 400 to facilitate understanding of various aspects of the present disclosure. The method 400 of assisting a driver to park a vehicle using remote sensors may be implemented through a computer algorithm, machine executable code, or software instructions programmed into a suitable programmable logic device(s) of the vehicle, such as the vehicle control module, the device control module, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, the VCS 1 may be initialized and enabled based on a key-on position of an ignition system. The VCS 1 may initialize the one or more parking assist applications for execution. In response to the initialization of the VCS 1, the system may enable a wireless communication transceiver in operation 404. The VCS 1 may search for a parking automation system 102 requesting to connect with the system in operation 406. If the VCS 1 detects no parking automation system 102 requesting to connect, the system may continue to output a wireless communication message via the transceiver.

If the parking automation system 102 is detected, the VCS 1 may attempt to connect using a wireless communication link via the transceiver. The communication link may include wireless communication technology (Bluetooth, Bluetooth low energy, WiFi, etc., for example). In response to the communication link with the parking automation system 102, the VCS 1 may receive parking assist data in operation 408. The VCS 1 may calculate a parking target distance value and/or a width value for the parking spot 206 based on the parking assist data. The parking target distance value may include the length of the parking spot and the current position of the vehicle in relation to the length. The width value may include the width of the parking spot and the current position of the vehicle in relation to the width.

In operation 410, the VCS 1 may compare the parking target distance value to a distance threshold value. If the parking target distance value is less than the distance threshold value, the VCS 1 may transmit a brake request to the brake system in operation 412. The VCS 1 may continue to receive the parking assist data if the parking target distance value is greater than the distance threshold value.

For example, if the parking space is located in the garage, the target distance value may include a current vehicle position relative to a garage wall facing the front of the vehicle. In response to the target distance value containing the current vehicle position relative to the garage wall, the distance threshold value may equal a predefined distance value keeping the vehicle a defined distance from the garage wall. The VCS 1 may be configured to stop the vehicle via the brake system based on the target distance value being less than the distance threshold value.

In operation 414, the VCS 1 may compare the width value to a width threshold value. If the width value is less than the width threshold value, the VCS 1 may transmit a steering wheel turn request to the EPS in operation 416.

Continuing from the example above, the garage may have a width threshold value for the parking space. A parking space width value may include a current vehicle position relative to the width threshold value of the parking space. In response to the width threshold value containing the current vehicle position in relation to the parking space, the width threshold value may equal a predefined width value keeping the vehicle in a defined position (to prevent the vehicle from hitting a sidewall of the garage or a car parked next to the parking space, for example). The VCS 1 may be configured to turn the steering wheel of the vehicle based on the width value being less than the width threshold.

In operation 418, the VCS 1 may calculate the current position of the vehicle based on the target distance value and the width value received from the parking automation system 102. If the VCS 1 calculates that the vehicle is not parked in the parking spot based on the distance threshold value, the width threshold value, and/or a combination thereof, the system may continue to receive parking assist data from the parking automation system 102 in operation 408. If the VCS 1 calculates that the vehicle is in the parked position of the parking spot, the system may request the transmission gear to be selected to a PARK position. In response to the PARK position, the VCS 1 may end the method 400 in operation 420.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle parking assist system comprising:
   a processor configured to:
      communicate with a parking automation system external to a vehicle, the parking automation system having at least one sensor configured to provide a measured distance value from a detected object to the vehicle, wherein the at least one sensor comprises a camera; and
      responsive to the measured distance value, control a brake system of the vehicle to stop the vehicle based on the measured distance value being less than a first predefined threshold.

2. The vehicle parking assist system of claim 1 wherein the measured distance value is a distance from a wall of a garage to the vehicle, and the first predefined threshold is a calibrated distance so that the vehicle stops before contacting the wall of the garage.

3. The vehicle parking assist system of claim 2, wherein the processor is further configured to transmit to a display a value of the distance from the wall of the garage to the vehicle.

4. The vehicle parking assist system of claim 1, wherein the processor is further configured to receive a brake override request via input at a brake pedal sensor.

5. The vehicle parking assist system of claim 1, wherein the parking automation system is configured with a global system for mobile communications network to communicate with the processor.

6. The vehicle parking assist system of claim 1, wherein the processor is further configured to establish communication with a mobile device and to communicate with the parking automation system via the mobile device.

7. The vehicle parking assist system of claim 1, wherein the at least one sensor further comprises a first garage sensor, a second garage sensor, and a third garage sensor.

8. A vehicle parking assist system configured to communicate with a parking automation system having first, second, and third garage sensors external to a vehicle, at least one of which providing a measured distance value from a detected object to the vehicle, the vehicle parking assist system comprising:
   a processor configured to:
   establish communication with the parking automation system;
   receive a sidewall distance value from at least one of the first, second, and third garage sensors;
   control a brake system of the vehicle in response to the measured distance value so that the vehicle comes to a stop based on the measured distance value being less than a first predefined threshold; and
   control an electrically assisted power steering system based on the sidewall distance value being less than a second predefined threshold.

9. The vehicle parking assist system of claim 8, wherein the sidewall distance value of a garage is a distance from a sidewall of the garage to the vehicle, and the second predefined threshold is a calibrated distance so that the vehicle turns via the electrically assisted power steering system before contacting the sidewall of the garage.

10. The vehicle parking assist system of claim 9, wherein the processor is further configured to transmit to a display a value of the distance from the sidewall of the garage to the vehicle.

11. The vehicle parking assist system of claim 8, wherein the processor is further configured to receive a steering wheel override request via input at a steering wheel sensor.

12. A vehicle computing system comprising:
   a processor in communication with a remote parking automation system (PAS) having first and second sensors external to a vehicle, the processor configured to:
   control a brake system based on a first distance value received from the first sensor being less than a first predefined threshold; and
   control a power steering system based on a second distance value received from the second sensor being less than a second predefined threshold, wherein at least one of the first and second sensors comprises a camera.

13. The vehicle of claim 12, wherein the first distance value is a distance from a wall of a garage to the vehicle, and the first predefined threshold is a calibrated distance so that the vehicle stops before contacting the wall of the garage.

14. The vehicle of claim 13, wherein the processor is further configured to transmit to a display a value of the distance from the wall of the garage to the vehicle.

15. The vehicle of claim 12, wherein the second distance value of a garage is a distance from a sidewall of the garage to the vehicle, and the second predefined threshold is a calibrated distance so that the vehicle turns via the power steering system before contacting the sidewall of the garage.

* * * * *